(12) United States Patent
Kusupati et al.

(10) Patent No.: US 12,456,259 B2
(45) Date of Patent: Oct. 28, 2025

(54) EDITING THREE-DIMENSIONAL MODELS UTILIZING IMPLICIT FUNCTION HANDLES

(71) Applicant: Adobe Inc., San Jose,, CA (US)

(72) Inventors: Uday Kusupati, Laussanne (CH); Jean Thiery, Paris (FR); Adrien Kaiser, Lyons (FR)

(73) Assignee: Adobe Inc., San Jose, CA (US)

( * ) Notice: Subject to any disclaimer, the term of this patent is extended or adjusted under 35 U.S.C. 154(b) by 322 days.

(21) Appl. No.: 18/181,232

(22) Filed: Mar. 9, 2023

(65) Prior Publication Data
US 2024/0303930 A1    Sep. 12, 2024

(51) Int. Cl.
G06T 17/20    (2006.01)

(52) U.S. Cl.
CPC ................... G06T 17/205 (2013.01)

(58) Field of Classification Search
CPC ............. G06F 3/04845; G06F 3/04847; G06T 17/205; G06T 19/20; G06T 2200/24; G06T 2219/2021
USPC .................................................. 345/419, 619
See application file for complete search history.

(56) References Cited

U.S. PATENT DOCUMENTS

| | | | |
|---|---|---|---|
| 7,737,969 B2 * | 6/2010 | Shen ........................ | G06T 17/20 345/419 |
| 12,165,258 B2 * | 12/2024 | Zhu ........................... | G06T 17/10 |
| 2013/0124149 A1 * | 5/2013 | Carr .......................... | G06F 30/00 703/2 |

OTHER PUBLICATIONS

Greg Turk et al., Shape Transformation Using Variational Implicit Functions, SIGGRAPH '05:ACM Siggraph 2005 Courses, Jul. 31, 2005, pp. 335-342 (also labeled pp. 13-20).*
Yifan, Wang, Lukas Rahmann, and Olga Sorkine-Hornung. "Geometry-consistent neural shape representation with implicit displacement fields." ICLR. 2022.
Yifan, Wang, et al. "Neural cages for detail-preserving 3d deformations." Proceedings of the IEEE/CVF Conference on Computer Vision and Pattern Recognition. 2020.
Morreale, Luca, et al. "Neural Convolutional Surfaces." Proceedings of the IEEE/CVF Conference on Computer Vision and Pattern Recognition. 2022.
Yin, Kangxue, et al. "3dstylenet: Creating 3d shapes with geometric and texture style variations." Proceedings of the IEEE/CVF International Conference on Computer Vision. 2021.

(Continued)

*Primary Examiner* — Jacinta M Crawford
(74) *Attorney, Agent, or Firm* — Keller Preece PLLC

(57) ABSTRACT

Methods, systems, and non-transitory computer readable media are disclosed for transferring modifications or deformations from a three-dimensional model of one type to a three-dimensional model of another type. In some embodiments, the disclosed systems receive an indication of a user interaction defining a modification to a three-dimensional model. In some cases, the disclosed systems modify an implicit function corresponding to the three-dimensional model in response to the user interaction. In certain embodiments, the disclosed systems generate a modified three-dimensional model by transferring the modification from the implicit function to the three-dimensional model. Further, in some embodiments, the disclosed systems provide the modified three-dimensional model for display on a client device.

20 Claims, 10 Drawing Sheets

(56) References Cited

OTHER PUBLICATIONS

Olga Sorkine and Marc Alexa. "As-rigid-as-possible surface modeling." Symposium on Geometry processing. vol. 4. 2007.
Zohar Levi and Craig Gotsman. "Smooth rotation enhanced as-rigid-as-possible mesh animation." IEEE transactions on visualization and computer graphics 21.2 (2014): 264-277.
Combined Search and Examination Report received in application No. 2318850.1 dated Nov. 21, 2024.
Jean-Marc Thiery et al. "Jacobians and Hessians of mean value coordinates for closed triangular meshes", Visual Computer 30, 981-995 (2013). https://doi.org/10.1007/s00371-013-0889-y.
Kyle Genova et al. "Learning Templates with Structured Implicit Functions", 12 pages, arXiv preprint arXiv: 1904.06447v1, Apr. 12, 2019.
Matheus Gadelha et al. "Learning Generative Models of Shape Handles," in 2020 IEEE/CVF Conference on Computer Vision and Pattern Recognition (CVPR), Seattle, WA, USA, 2020, pp. 399-408, doi: 10.1109/CVPR42600.2020.00048.
Mehmet Ersin Yumer et al. "Semantic Shape Editing Using Deformation Handles", ACM Transactions on Graphics (TOG), vol. 34, Issue 4, Article No. 86, pp. 1-12, Jul. 27, 2015, https://doi.org/10.1145/276690.
Rodolphe Vaillant et al. "Implicit skinning: Real-Time Skin Deformation with Contact Modeling", ACM Transactions on Graphics (TOG), vol. 32, Issue 4, Article No. 125, pp. 1-12, Jul. 21, 2013, https://doi.org/10.1145/2461912.2461960.
Tao Ju et al. "Mean Value Coordinates for Closed Triangular Meshes", ACM Transactions on Graphics (TOG), vol. 24, Issue 3, pp. 561-566, Jul. 1, 2005, https://doi.org/10.1145/1073204.1073229.

\* cited by examiner

EDITING THREE-DIMENSIONAL MODELS UTILIZING IMPLICIT FUNCTION HANDLES

BACKGROUND

Recent years have seen significant advancement in hardware and software platforms for viewing and manipulating three-dimensional models. Indeed, the use of procedural modeling systems and other three-dimensional content editing systems have become increasingly ubiquitous, and procedural modeling systems have been developed to generate large numbers of shapes by configuring parameters of the procedural model. For instance, in the field of procedural models, some models utilize parameters associated with a set of rules to expand, shrink, and/or perform a wide variety of transformations on a three-dimensional object. Despite these advancements, a number of technical problems exist in the field of configurable parameters and procedural modeling, particularly with accuracy and flexibility.

SUMMARY

One or more embodiments described herein provide benefits and/or solve one or more of the foregoing or other problems in the art with systems, methods, and non-transitory computer-readable media that accurately and flexibly transfer semantic modifications from an implicit function representation to a more explicit three-dimensional model. In particular, in one or more embodiments, the disclosed systems edit a source three-dimensional shape given constraints from a low-frequency, low-parameter procedural model defined as an analytical implicit function. For example, the disclosed systems receive edits to an implicit function in the form of interactions with parameter handles for adjusting semantic parameters of the model. Based on such adjustments to semantic parameters of the implicit function, in some embodiments, the disclosed systems transfer the resultant modifications to a source three-dimensional model to compute the transformed target three-dimensional model while preserving unmodified regions of the source model. In this manner, the disclosed systems accurately and flexibly utilize semantic parameter modifications of an implicit function to modify or deform another three-dimensional model.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
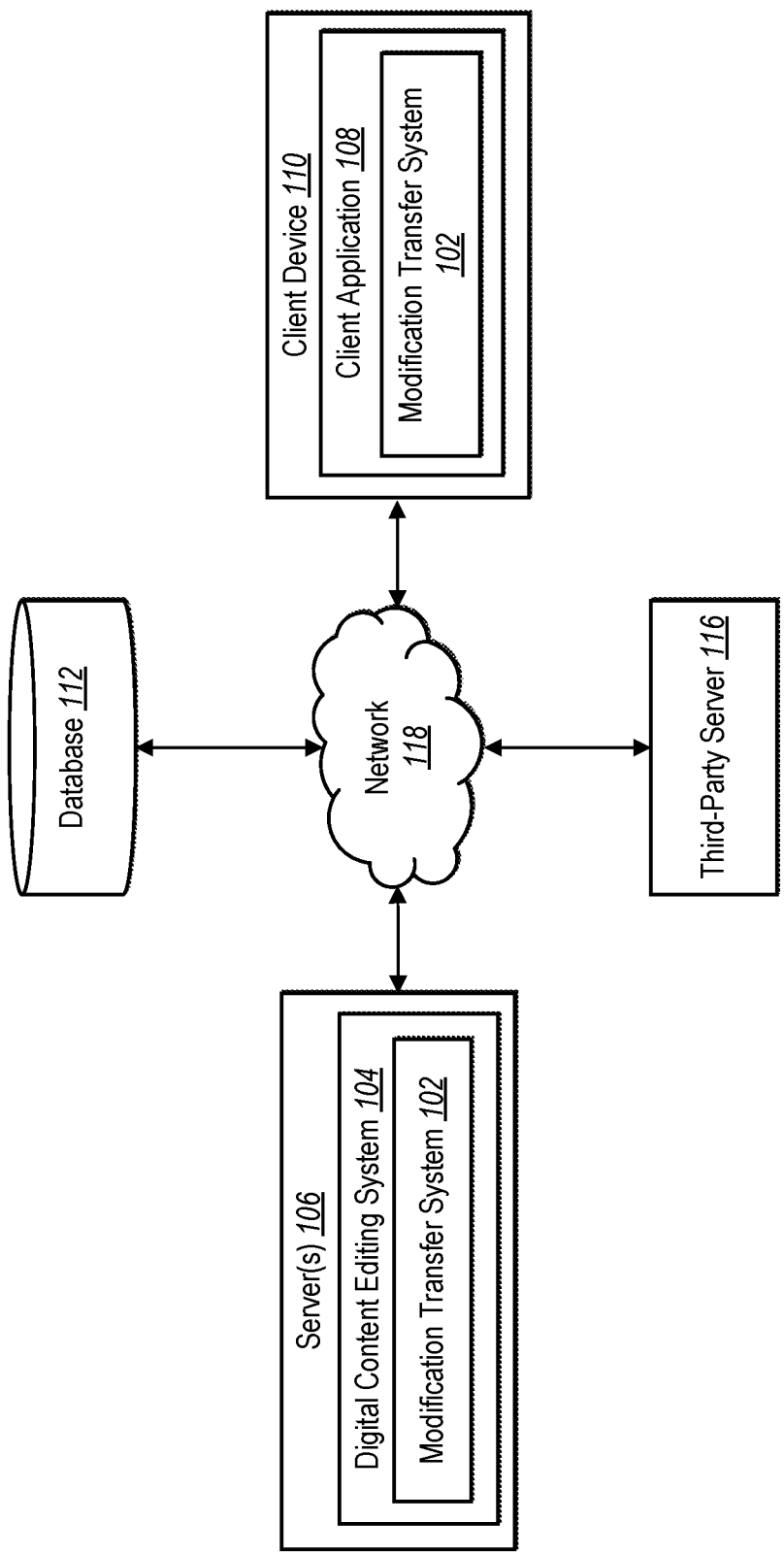
FIG. 1 illustrates an example environment in which a modification transfer system operates in accordance with one or more embodiments.

One or more embodiments described herein include a modification transfer system that transfers modifications from an implicit function to a three-dimensional model. Existing three-dimensional editing systems suffer from several technological shortcomings that result in excessive user interaction and inflexible operation. For instance, existing three-dimensional editing systems often require editing real world shapes by manually tweaking each minute detail using sophisticated editing tools until achieving the desired result. Using such sophisticated systems requires expert or advanced knowledge to properly modify each detail of a three-dimensional shape, and the complex nature of the shapes prevents existing systems from providing simplified parameter editing tools. For example, existing systems rely on various control structures (e.g., cage, skeletons, and/or physics-based solutions) that are complex and difficult to define.

In addition to their cumbersome interfaces and onerous editing tools, some existing three-dimensional editing systems are also inflexible. As just suggested, many existing systems are limited to editing three-dimensional models in low resolutions and/or in low level parameter spaces. Consequently, some existing systems cannot adapt to deforming three-dimensional models in high resolutions while preserving details, at least not without greatly increasing the parameter space. Specifically, procedural models of existing systems cannot utilize configurable parameters of low-level geometry shapes for modifying three-dimensional models in high resolution while maintaining arbitrary details of the models at the high resolution.

To overcome the deficiencies of prior systems, the modification transfer system utilizes a unique approach to transfer modifications of an implicit function to a three-dimensional model. For example, the modification transfer system receives user input to modify the three-dimensional model via parameter-specific interface elements (e.g., handles) for adjusting semantic parameters of the three-dimensional model. In some cases, the adjustable semantic parameters reflect or define individual features of an implicit function that resembles or reflects a three-dimensional model. For example, if the implicit function is a three-dimensional representation of a table, the modification transfer system provides adjustable handles for modifying semantic parameters corresponding to the position, length, and/or width of the legs of the table.

In some cases, based on receiving user input (e.g., adjustment of the semantic parameters), the modification transfer system modifies the implicit function. In particular, the modification transfer system updates the implicit function to incorporate the modifications made by the user. For example, in one or more embodiments, based on receiving user input (e.g., adjustment of the semantic parameters), the modification transfer system adjusts the implicit function and generates an edited implicit function that represents a modified three-dimensional model.

In one or more embodiments, based on the edited implicit function, the modification transfer system modifies a three-dimensional model (e.g., by transferring the modifications made to the implicit function). For instance, the modification transfer system transfers the modifications from the implicit function in a low-frequency, low-parameter space to the three-dimensional model in a high-frequency, high-resolution space. In some embodiments, the three-dimensional model has highly detailed geometric features within the high-frequency, high resolution space. To achieve this, in some embodiments, the modification transfer system determines scalar implicit function values and/or scalar implicit function gradients that indicate the differences between an initial version of an implicit function and a modified version of the implicit function after modification. In some cases, the modification transfer system further transfers the modifications to the three-dimensional model (e.g., a polygonal surface made up of vertices and triangles) by tracking changes to the signed distance function and its derivatives.

As suggested, the modification transfer system provides several advantages over prior systems. For example, the modification transfer system provides new editing tools for three-dimensional shapes for improved user interface simplicity and efficiency. Using the new semantic parameter handles described herein, the modification transfer system provides much simpler, more efficient (e.g., with fewer interactions) user interface tools for modifying or deforming three-dimensional shapes, especially at high resolutions. To elaborate, unlike existing systems that require immersive interaction and expert manipulation of sophisticated editing tools (e.g., for point-by-point adjustments of a mesh), the modification transfer system utilizes a unique approach to transfer modifications from an implicit function to a three-dimensional model using interface elements specific to semantic parameters. For example, the modification transfer system provides handles for modifying semantic and/or geometric parameters of an implicit function (e.g., as an intermediate representation of a three-dimensional shape). Additionally, unlike existing systems that cannot specifically indicate which semantic parameters correspond to which features of a three-dimensional model, the modification transfer system utilizes implicit functions that can be parameterized and templated by user (e.g., for direct correspondence with semantic parameters adjustable via the handles).

In addition, in some embodiments, the modification transfer system subdivides certain edits for incremental deformations. Thus, the modification transfer system prevents distortions, mistakes, and/or unwanted modifications to three-dimensional models. Accordingly, the modification transfer system precisely transfers edits from an implicit function to another without distorting portions of the three-dimensional mesh that are not part of the modification.

Additionally, in some embodiments, the modification transfer system improves the flexibility of existing three-dimensional editing systems. For instance, unlike some prior systems that are limited to editing three-dimensional models in low resolutions and/or low level parameter spaces, the modification transfer system uses a unique modification transfer process to translate modifications made to low-frequency, low-parameter models (e.g., represented here by implicit functions) to complex, real-world shapes (e.g., represented by three-dimensional meshes). By utilizing a process to preserve scalar implicit function values and/or scalar implicit function gradient values, the modification transfer system flexibly adapts to a variety of shapes at many different resolutions and parameter space sizes.

Additional detail regarding the modification transfer system will now be provided with reference to the figures. For example, FIG. 1 illustrates a schematic diagram of an example system environment for implementing a modification transfer system 102 in accordance with one or more embodiments. An overview of the modification transfer system 102 is described in relation to FIG. 1. Thereafter, a more detailed description of the components and processes of the modification transfer system 102 is provided in relation to the subsequent figures.

As shown, the environment includes server(s) 106, a client device 110, a database 112, a third-party server 116, and a network 118. Each of the components of the environment communicate via the network 118, and the network 118 is any suitable network over which computing devices communicate. Example networks are discussed in more detail below in relation to FIG. 10.

As mentioned, the environment includes a client device 110. The client device 110 is one of a variety of computing devices, including a smartphone, a tablet, a smart television, a desktop computer, a laptop computer, a virtual reality device, an augmented reality device, or another computing device as described in relation to FIG. 10. The client device 110 communicates with the server(s) 106, the database 112 and/or the third-party server 116 via the network 118. For example, the client device 110 provides information to the server(s) 106 indicating client device interactions (e.g., modifications to semantic handles within a model manipulation interface) and receives information from the server(s) 106, database 112, third-party server 116 (or elsewhere) such as renderings of three-dimensional models before and after modifications are applied. Thus, in some cases, the modification transfer system 102 on the server(s) 106 provides and receives information based on client device interaction via the client device 110.

As shown in FIG. 1, the client device 110 includes a client application 108. In particular, the client application 108 is an instance of a web application, a native application installed on the client device 110 (e.g., a mobile application, a desktop application, etc.), or a cloud-based application where all or part of the functionality is performed by the server(s) 106. Based on instructions from the client application 108, the client device 110 presents or displays information to a user, including three-dimensional models and a model manipulation interface that includes semantic handles for modifying parameters of a model. In some cases, the client application 108 communicates with the third-party server 116 to retrieve or access a second three-dimensional model from a website or a model repository storing three-dimensional meshes.

Indeed, as illustrated in FIG. 1, the environment includes a database 112. In one or more embodiments, the database 112 can be located external to the server(s) 106 (e.g., in communication via the network 118) or located on the server(s) 106 and/or on the client device 110. Additionally, the environment can include one or more three-dimensional models as part of the modification transfer system 102 within the database 112, included as part of the client application 108, or housed on the server(s) 106.

As illustrated in FIG. 1, the environment includes the third-party server 116. In some embodiments, the third-party server 116 is external to the server(s) 106, the database 112, and/or the client device 110. In some cases, the third-party server 116 contains or houses a three-dimensional model that is external to the modification transfer system 102. For example, the third-party server 116 hosts a website or a repository of three-dimensional meshes accessible via the network 118. In certain embodiments, the server(s) 106, the database 112, and/or the client device 110 may access a three-dimensional model in the form of a three-dimensional mesh housed on the third-party server 116.

As illustrated in FIG. 1, the environment includes the server(s) 106. The server(s) 106 generates, tracks, stores, processes, receives, and transmits electronic data, such as three-dimensional model data, including semantic parameters, mesh vertices, and/or faces. For example, the server(s) 106 receives data from the third-party server 116 in the form of three-dimensional model data (e.g., three-dimensional mesh data indicating mesh vertices, edges, and/or faces). In response, the server(s) 106 generates and transmits data (e.g., three-dimensional mesh data) to the client device 110 to present or display a representation of the three-dimensional model data from the third-party server 116.

In some embodiments, the server(s) 106 communicates with the client device 110, the database 112, and/or the third-party server 116 to transmit and/or receive data via the network 118, including client device interactions, three-dimensional models, three-dimensional model modifications, and/or other data. In some embodiments, the server(s) 106 comprises a distributed server where the server(s) 106 includes a number of server devices distributed across the network 118 and located in different physical locations. The server(s) 106 comprise a content server, an application server, a communication server, a web-hosting server, a multidimensional server, a container orchestration server, or a machine learning server. The server(s) 106 further access and utilize a database 112 to store and retrieve information such as three-dimensional model data, and/or three-dimensional model modification data.

As further shown in FIG. 1, the server(s) 106 also includes the modification transfer system 102 as part of a digital content editing system 104. For example, in one or more implementations, the digital content editing system 104 is able to track, store, generate, modify, edit, enhance, provide, distribute, and/or share content, such as three-dimensional models. For example, the digital content editing system 104 provides tools to generate and modify various three-dimensional models using semantic parameter handles and/or by transferring modifications from one model to another. In one or more embodiments, the server(s) 106 includes all, or a portion of, the modification transfer system 102. For example, the modification transfer system 102 operates on the server(s) 106 to generate and provide a modified three-dimensional mesh by transferring modifications from semantic handle adjustments of a low-parameter model (e.g., represented by the implicit function).

In certain cases, the client device 110 includes all or part of the modification transfer system 102. For example, the client device 110 generates, obtains (e.g., downloads), or utilizes one or more aspects of the modification transfer system 102 from the server(s) 106. Indeed, in some implementations, as illustrated in FIG. 1, the modification transfer system 102 is located in whole or in part on the client device 110. For example, the modification transfer system 102 includes a web hosting application that allows the client device 110 to interact with the server(s) 106. To illustrate, in one or more implementations, the client device 110 accesses a web page supported and/or hosted by the server(s) 106.

Although FIG. 1 illustrates a particular arrangement of the environment, in some embodiments, the environment has a different arrangement of components and/or may have a different number or set of components altogether. For instance, as mentioned, the modification transfer system 102 is implemented by (e.g., located entirely or in part on) the client device 110. In addition, in one or more embodiments, the client device 110 communicates directly with the modification transfer system 102, bypassing the network 118. Further, in some embodiments, the database 112 is maintained and/or housed by the server(s) 106, the client device 110, or a third-party device.

Figure 2:
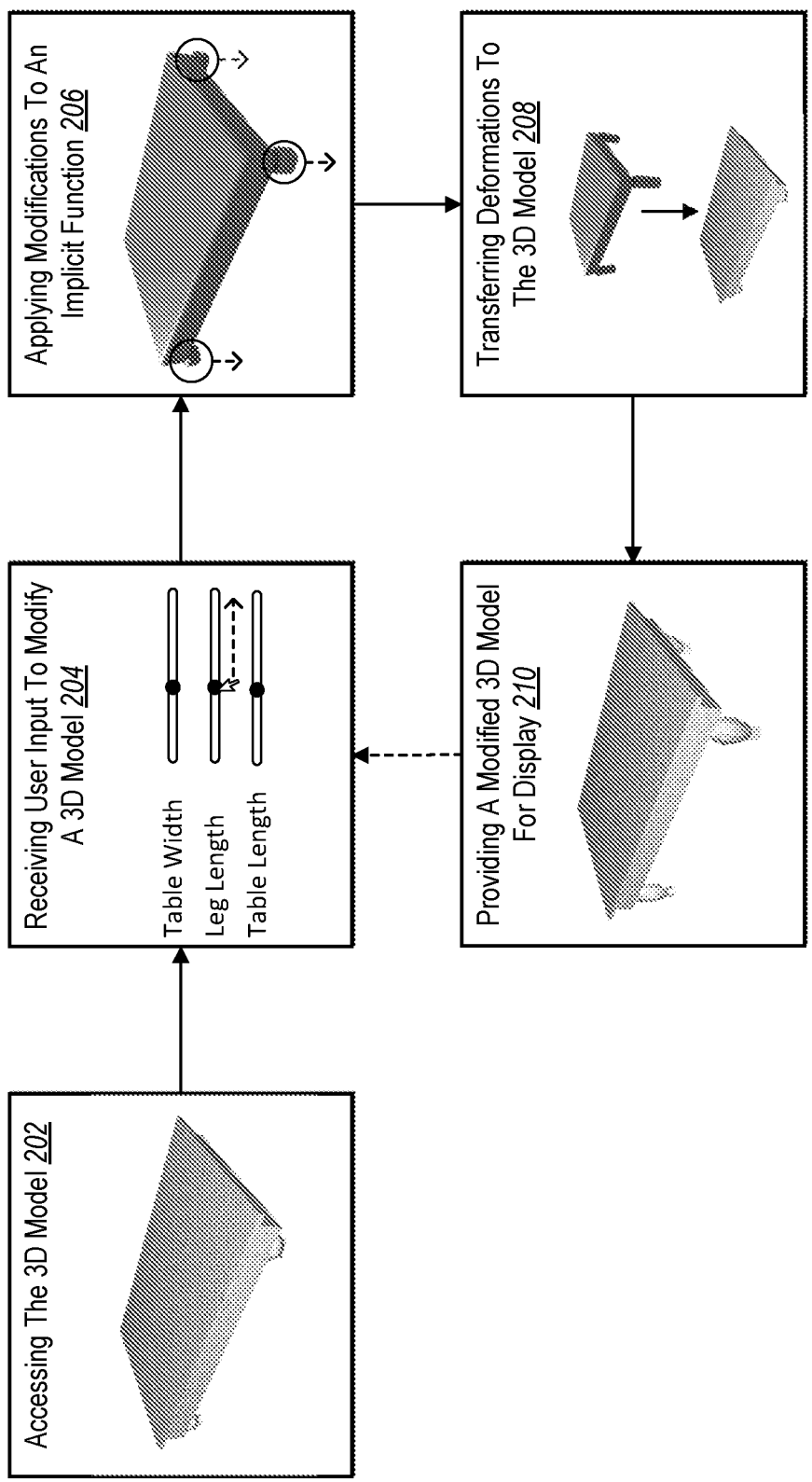
FIG. 2 illustrates an overview diagram of the modification transfer system transferring modifications from an implicit function to a three-dimensional model in accordance with one or more embodiments.

As mentioned above, in one or more embodiments, the modification transfer system 102 transfers a modification from an implicit function to a three-dimensional model. For example, the modification transfer system 102 transfers a modification made to a low-parameter three-dimensional model (e.g., represented by the implicit function) to a high-parameter three-dimensional model of a different model type, such as a three-dimensional mesh. FIG. 2 illustrates an example overview of transferring modifications from an implicit function to a three-dimensional model in accordance with one or more embodiments. The description of FIG. 2 provides an overview of various acts and processes associated with the modification transfer system 102, and additional detail regarding the various acts illustrated in FIG. 2 is provided thereafter with reference to subsequent figures.

As shown in FIG. 2, the modification transfer system 102 performs an act 202 for accessing a three-dimensional model. For example, the modification transfer system 102 receives a three-dimensional model from the client device 110 as an upload or a selection from a website or some other model source (e.g., a repository of three-dimensional meshes that is external to the modification transfer system 102 or the digital content editing system 104). For instance, the modification transfer system 102 receives an indication or a request from the client device 110 to access a third-party website or a third-party application (e.g., hosted by the third-party server 116) that stores the three-dimensional model at a third-party server. In one or more cases, the modification transfer system 102 accesses, retrieves, identifies, and/or receives the three-dimensional model in the form of a three-dimensional mesh.

As just mentioned, in one or more embodiments, the three-dimensional model is represented by a three-dimensional mesh. For example, a three-dimensional mesh includes or is made up of lines (e.g., edges), vertices (e.g., reference points in three-dimensional space, such as along the X, Y, and Z axes, or in polar coordinates), and triangular or quadrilateral planes (e.g., faces) that define a shape and/or form. Upon accessing a three-dimensional mesh, the modification transfer system 102 pinpoints the vertices, edges, and/or faces that define the form of the three-dimensional mesh. In some cases, changing locations of vertices of a three-dimensional mesh results in corresponding changes to edges and/or faces as well (e.g., to maintain the same edges connecting the vertices), thus deforming the three-dimensional mesh into a different shape.

As illustrated in FIG. 2, the modification transfer system 102 performs an act 204 of receiving user input to modify a three-dimensional model. In particular, the modification transfer system 102 receives adjustments to one or more parameter-specific interface elements (e.g., handles) for altering one or more semantic parameters of the three-dimensional model. For instance, the modification transfer system 102 receives an indication of user interaction sliding a handle to a new position on a slider bar to adjust a width, height, length, tilt, rotation, or some other semantic parameter of one or more portions of a three-dimensional model. As shown, the modification transfer system 102 receives an input to increase a leg length of the table.

As further illustrated in FIG. 2, the modification transfer system 102 performs an act 206 for applying modifications to an implicit function. Indeed, in one or more embodiments, a model is represented by an implicit function that is modifiable via a model manipulation interface that includes handles for adjusting individual semantic parameters. In some cases, the modification transfer system 102 generates the implicit function that fits the three-dimensional model based on a directed acyclic graph consisting of semantic parameters (where the parameters define the shape of the model). Based on fitting the implicit function and the three-dimensional model, the modification transfer system 102 provides interface handles for modifying semantic parameters.

As mentioned above, in some cases, the modification transfer system 102 receives an indication of user interaction modifying one or more semantic parameters through adjustments to handles within a model manipulation interface. Based on such user input modifying parameters of the three-dimensional model, the modification transfer system 102 modifies, edits, and/or updates the implicit function to determine changes to make to the model. For example, the implicit function is a parametric function made up of one or more variables that define semantic parameters. If the three-dimensional model takes the form of a table, for instance, one or more variables of the implicit function represent the height of the table, while other variables correspond to the width (and other visual characteristics) of the table (and/or components of the table, such as the tabletop or the legs). To further illustrate, if the system receives user input modifying the length of the table legs, the modification transfer system 102 updates the variables of the implicit function to represent the new length.

Thus, in some cases, the modification transfer system 102 generates a modified implicit function indicating the modifications to the semantic parameters. In some cases, the modification transfer system 102 compares the initial implicit function with the modified implicit function to determine the modifications made to the implicit function. For instance, the modification transfer system determines the difference between the variables of the initial implicit function and the modified implicit function and/or determines the adjustments made to the semantic parameters of the implicit function.

As previously indicated and as further illustrated in FIG. 2, the modification transfer system 102 performs an act 208 for transferring deformations to the three-dimensional model. Indeed, the modification transfer system 102 transfers deformations from the implicit function to the three-dimensional model without needing to directly modify the three-dimensional model. Specifically, the modification transfer system 102 transfers edits made to the implicit function to the three-dimensional mesh representing the three-dimensional model. For instance, the modification transfer system 102 transfers implicit function modifications to vertices of the three-dimensional mesh while preserving scalar implicit function values and scalar implicit function gradients associated with the implicit function.

To transfer modifications from the implicit function to the three-dimensional model, in some embodiments, the modification transfer system 102 deforms and regularizes, as a sequence of update steps, all the vertices of the three-dimensional mesh according to deformations made to the implicit function. For example, as the modification transfer system 102 deforms each vertex of the three-dimensional mesh over a series of steps, the modification transfer system 102 regularizes the deformations while maintaining the scalar implicit function values and scalar implicit function gradients of the implicit function before and after modification (e.g., in relation to corresponding vertices of the three-dimensional mesh). More detail regarding the scalar implicit function values and scalar implicit function gradients is discussed in reference to FIG. 4.

As further indicated in FIG. 2 the modification transfer system 102 performs an act 210 for providing the modified three-dimensional model for display. In one or more embodiments, the modification transfer system 102 provides, for display on the client device 110, an edited or deformed version of a three-dimensional model (e.g., a three-dimensional mesh). For example, the modification transfer system 102 generates or renders a modified version of a three-dimensional mesh that results from transferring modifications from an implicit function. For example, based on detecting modifications to a handle of the implicit function corresponding to a semantic parameter for the length, the modification transfer system 102 transfers the modification from the modified implicit function to vertices of the three-dimensional mesh and provides for display a modified version of the three-dimensional mesh (e.g., with a commensurately modified length). Accordingly, in some embodiments, the modification transfer system 102 allows the user to make additional modifications by further adjusting handle(s) associated with the semantic parameter(s) of the implicit function.

Figure 3:
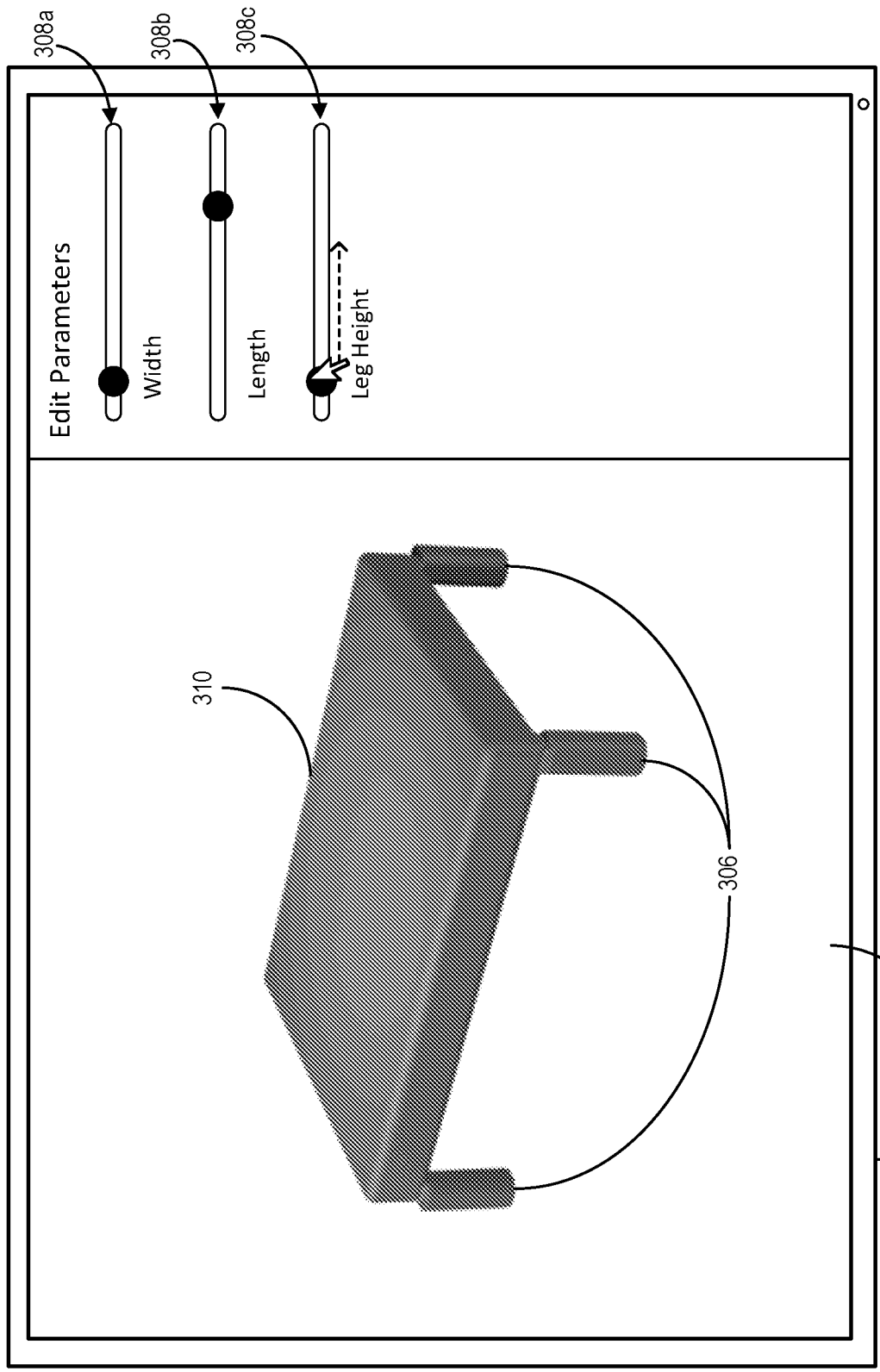
FIG. 3 illustrates a graphical user interface depicting one or more handles for adjusting one or more semantic parameters associated with the implicit function in accordance with one or more embodiments.

As mentioned above, in certain described embodiments, the modification transfer system 102 provides parameter-specific interface elements (e.g., handles) for adjusting semantic parameters of a low-frequency, low-parameter model defined by an implicit function. In particular, the modification transfer system 102 provides interface elements in the form of handles that enables a user to intuitively adjust parameters defining visual characteristics of a three-dimensional model, where some parameters directly affect constituent parts, portions, or components of the model (e.g., legs of a table or the back of a chair). FIG. 3 illustrates an example model manipulation interface including handles for modifying semantic parameters in accordance with one or more embodiments.

As illustrated in FIG. 3, the client device 302 (e.g., the client device 110) displays or presents a model manipulation interface 304 that includes a depiction of a three-dimensional model 310 (e.g., a low-frequency, low-parameter three-dimensional model represented by an implicit function) together with handles 308a-308c for adjusting respective semantic parameters associated with the three-dimensional model 310. As shown, the three-dimensional model 310 is in the form of a table with table legs located at the outermost corners of the tabletop.

FIG. 3 displays a depiction of a three-dimensional model 310. As previously mentioned, the modification transfer system 102 represents the three-dimensional model 310 with an implicit function. In some cases, the modification transfer system 102 utilizes shape fitting code to fit the implicit function to a three-dimensional mesh representing a second three-dimensional model. For instance, the shape fitting code procedurally generates shapes (e.g., implicit functions) based on a directed acyclic graph consisting of the semantic parameters of the three-dimensional mesh representing the second three-dimensional model. Thus, in some cases, the shape fitting code represents the generated shapes as analytical implicit functions. In one or more embodiments, the source code utilizes differentiable analytical signed distance functions to determine the best fit parameters between the implicit function and the three-dimensional mesh.

As shown in FIG. 3, the model manipulation interface 304 includes a first handle 308a corresponding to the width of the three-dimensional model 310, a second handle 308b corresponding to the length of the three-dimensional model 310, and a third handle 308c corresponding to the leg height of the three-dimensional model 310. In some embodiments, the modification transfer system 102 provides more handles for adjusting additional semantic parameters of various components of the three-dimensional model 310. For example, the modification transfer system 102 provides handles to modify (e.g., edit, rotate, shift, reposition, etc.) the width of the legs, thickness of the tabletop, position of the legs, etc. of the first three-dimensional model of the table.

In some cases, the modification transfer system 102 determines or selects handles to provide based on the shape and/or form of three-dimensional model 310. For instance, based on determining that the three-dimensional model is a couch, the modification transfer system 102 provides handles corresponding to the semantic parameters of the couch model and its components (e.g., the arms, legs, back, and cushions). For example, the modification transfer system 102 provides handles corresponding to the back of the couch, the width of the couch cushions, the length of the armrest, the height of the armrest, etc. In some embodiments, the modification transfer system 102 provides an additional user interface where the user selects one or more handles for the modification transfer system 102 to provide for display within the model manipulation interface 304.

Figure 4:
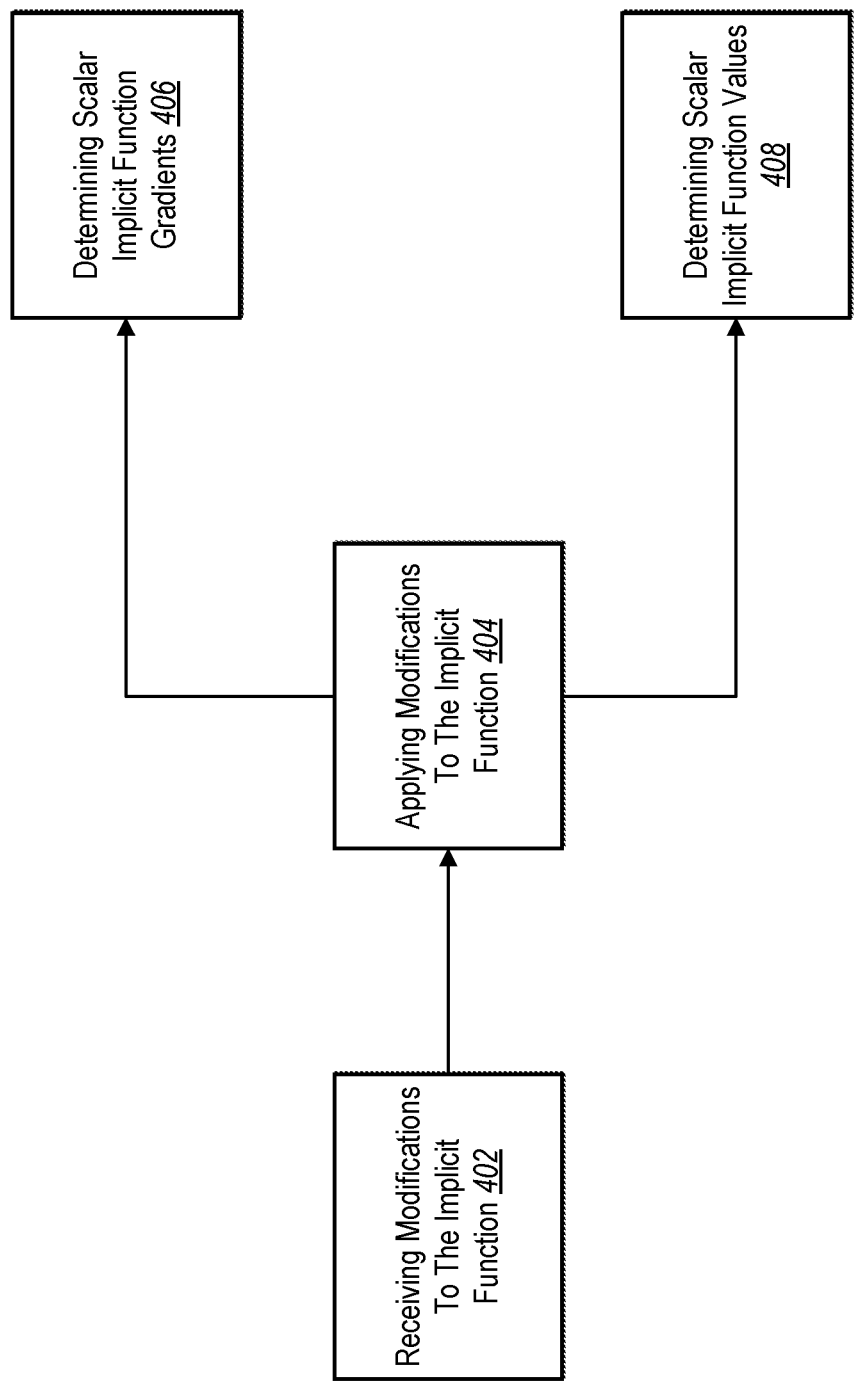
FIG. 4 illustrates an example diagram for determining scalar implicit functions (e.g., signed distance field values and signed distance field gradients) in accordance with one or more embodiments.

As previously mentioned, in some cases the modification transfer system 102 renders or presents adjustments to the three-dimensional model 310 based on interactions with the handles 308a-308c. Indeed, as shown, the modification transfer system 102 receives user input to adjust the third handle 308c to adjust the height of the table legs 306 of the three-dimensional model 310 by sliding the third handle 308c to the right. Based on the degree or distance of movement, the modification transfer system 102 increases the height of the table legs 306 of the three-dimensional model 310. In certain cases, the modification transfer system 102 provides alternative versions of handles to adjust model parameters, such as adjustable dials or fillable fields that adjust parameters based on numeric values entered in the fields. As mentioned above, in certain embodiments, the modification transfer system 102 propagates or transfers deformations from one model to another through scalar implicit function values and scalar implicit function gradients. In particular, the modification transfer system 102 determines scalar implicit function values and scalar implicit function gradients that result from modifying an implicit function (e.g., based on semantic handle adjustments). FIG. 4 illustrates an example diagram for determining scalar implicit function values and scalar implicit function gradients for a three-dimensional model in accordance with one or more embodiments.

As illustrated in FIG. 4, the modification transfer system 102 performs an act 402 for receiving modifications to an implicit function. In particular, as discussed above, the modification transfer system 102 receives user input modifying a semantic parameter of an implicit function. For instance, the modification transfer system 102 receives the modifications in the form of interactions with handles of a model manipulation interface.

Based on receiving the modification to the implicit function, the modification transfer system 102 further performs an act 404 for applying modifications to the implicit function. As previously mentioned, the modification transfer system 102 modifies the implicit function by modifying the variables of the implicit function according to modifications of semantic parameters defining the shape of a three-dimensional model. In some embodiments, the modification transfer system 102 applies modifications to the implicit function by comparing the unmodified implicit function (e.g., prior to handle adjustments) with the modified implicit function (e.g., after handle adjustments).

As further shown in FIG. 4, based on applying the modifications to the implicit function, the modification transfer system 102 performs an act 406 for determining scalar implicit function gradients (e.g., signed distance field gradients). To elaborate, the modification transfer system 102 determines the scalar implicit function gradients and/or the scalar implicit function values that define or reflect the relationships between an initial implicit function (before the user interaction for the edit) and a modified implicit function (after the user interaction for the edit). For instance, the modification transfer system 102 determines scalar implicit function values and gradients between points of an initial implicit function or points on a modified implicit function. For example, the modification transfer system 102 obtains the scalar implicit function values and gradients based on the modified implicit function. In some embodiments, the modification transfer system 102 determines scalar implicit function values and scalar implicit function gradients in the form of signed distance field values and signed distance field gradients that reflect mesh vertices and a parametric implicit function. For instance, the modification transfer system 102 determines scalar implicit function values and gradients between an implicit function and vertices of a three-dimensional mesh before a modification and further preserves those scalar implicit function values and gradients to define the relationship between a modified implicit function and modified mesh vertices after the modification.

In some cases, a gradient of an implicit scalar field describes or indicates a direction between a location in space and the nearest edge of a shape and/or function within the scalar implicit function. In some cases, a gradient of an implicit scalar field describes the direction of quickest local increase of the field and encodes a notion of local orientation of the function at this point. In some cases, when the implicit function is a signed distance field, the gradient is the most direct direction to take to get closer to (or further away from) the 0-set of the function, that is generally taken as the three-dimensional surface associated with the scalar volumetric field. In certain embodiments, the modification transfer system 102 determines the gradient for all points of an implicit function. In one or more cases, the modification transfer system determines gradients for all the vertices of a three-dimensional mesh. As discussed in more detail below (in reference to FIG. 5), the modification transfer system 102 preserves the gradients of the implicit function to guide the vertices of a modified three-dimensional mesh to their correct locations.

As further illustrated in FIG. 4, the modification transfer system 102 performs an act 408 for determining scalar implicit function values. For example, a scalar implicit function value includes or refers to a distance and/or a length between a point in space and the nearest edge of the isosurface within the signed distance field. For example, the modification transfer system 102 determines a value of an implicit function as a distance between a point in space and an updated point (e.g., a nearest point) on an updated implicit function (e.g., after modification). As another example the modification transfer system 102 determines a scalar implicit function value by querying the implicit function at the vertex (x, y, z) location. Indeed, in one or more embodiments, the modification transfer system 102 calculates or determines the difference between distances at all vertex locations of an initial implicit function and their updated counterparts on a modified implicit function.

Figure 5:
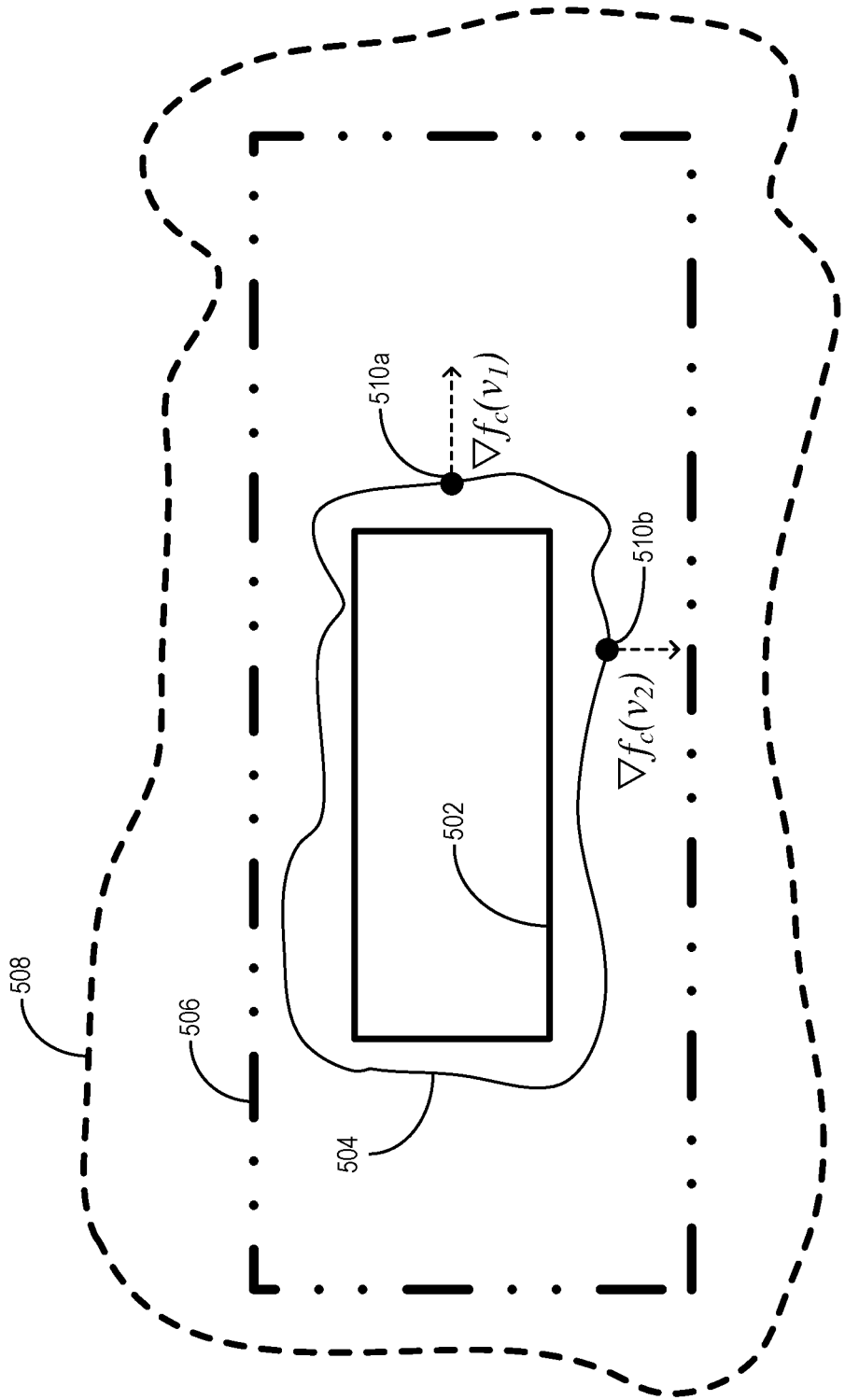
FIG. 5 illustrates an example diagram for transferring modifications from an implicit function to a three-dimensional model in accordance with one or more embodiments

As mentioned above, in certain embodiments, the modification transfer system 102 determines a relationship between gradients of an initial implicit function and a modified implicit function. For instance, the modification transfer system 102 compares scalar implicit function values by measuring or determining a distance on an initial implicit function and a modified implicit function. In some cases, based on determining the scalar implicit function gradients and/or scalar implicit function values, the modification transfer system 102 transfers modifications, adjustments, and/or edits (e.g., the edits that resulted in the values and gradients) from a first three-dimensional model to a second three-dimensional model. FIG. 5 illustrates an example diagram for transferring modifications from an implicit function to a three-dimensional model in accordance with one or more embodiments.

For illustrative purposes, and for ease of discussion, FIG. 5 depicts a two-dimensional space that includes shapes representing three-dimensional models. Indeed, as shown, an implicit function 502 is represented by a solid rectangle and a three-dimensional model 504 is represented by a solid curved shape. As further shown, the modification transfer system 102 determines scalar implicit function gradients and scalar implicit function values in the two-dimensional space to demonstrate how the modification transfer system 102 transfers modifications from the implicit function 502 (which modifications result in an input-modified implicit function 506) to the three-dimensional model 504 (to generate a transfer-modified three-dimensional model 508). While FIG. 5 illustrates a two-dimensional space, in certain embodiments, the modification transfer system 102 determines and utilizes scalar implicit function gradients and scalar implicit function values in a three-dimensional space for transferring modifications from the input-modified implicit function 506 to the three-dimensional model 504.

As shown in FIG. 5, the modification transfer system 102 fits the implicit function to a three-dimensional mesh representing the three-dimensional model 504. In one or more cases, the modification transfer system 102 fits the implicit function to the three-dimensional mesh prior to providing for display the one or more parameter-specific handles within a model manipulation interface. In some embodiments, the modification transfer system 102 can receive user input indicating which semantic parameters represent a given shape of the three-dimensional model 504. Thus, the modification transfer system 102 can edit the implicit function by receiving user input changing the semantic parameters.

As further shown in FIG. 5, the modification transfer system 102 generates the input-modified implicit function 506 represented by a dashed rectangle. For instance, the modification transfer system 102 generates the input-modified implicit function 506 as a modified version of the implicit function 502 that results from user interaction adjusting one or more parameter-specific handles within the model manipulation interface. Indeed, as shown, the input-modified implicit function 506 is a larger version of the implicit function 502. Based on the modification that results in generating the input-modified implicit function 506 from the implicit function 502, the modification transfer system 102 further determines scalar implicit function values and scalar implicit function gradients defining the modification. Indeed, the modification transfer system 102 determines distances and directions from initial points on the implicit function 502 and nearest points on the input-modified implicit function 506.

As further illustrated in FIG. 5, the three-dimensional model 504 is a three-dimensional mesh that contains a first vertex 510a and a second vertex 510b and that resembles or corresponds to the implicit function 502. The modification transfer system 102 applies a scalar implicit function value and a scalar implicit function gradient to the first vertex 510a to move the first vertex 510a commensurate with the modification that resulted in the input-modified implicit function 506. Similarly, the modification transfer system 102 applies a scalar implicit function value and a scalar implicit function gradient to the second vertex 510b to move the second vertex 510b commensurate with the modification that resulted in the input-modified implicit function 506.

Accordingly, by applying the scalar implicit function values and the scalar implicit function gradients to vertices of the three-dimensional model 504, the modification transfer system 102 transfers the modification made to the implicit function 502 that results in the input-modified implicit function 506, thus resulting in the transfer-modified three-dimensional model 508. Indeed, the modification transfer system 102 preserves the scalar implicit function values and the scalar implicit function gradients to generate a modified three-dimensional mesh from an initial three-dimensional mesh without needing to directly interact with the mesh in a high-parameter space. For instance, the modification transfer system 102 utilizes a linear system to ensure that the first scalar implicit function gradient $\nabla f_c(v_1)$ and the second scalar implicit function gradient $\nabla f_c(v_2)$ are preserved after displacing the corresponding vertices $v_1$ and $v_2$.

To generate the transfer-modified three-dimensional model 508, in some embodiments, the modification transfer system 102 deforms the vertices of the three-dimensional mesh represented by the three-dimensional model 504 based on two conditions: i) preserving the scalar implicit function values between the implicit function 502 and the input-modified implicit function 506 ($f_c(v_1)=f_m(v_1')$), and ii) preserving the scalar implicit function gradients between the implicit function 502 and the input-modified implicit function 506 ($\nabla f_c(v_1)=\nabla f_m(v_1')$). Indeed, the modification transfer system 102 maps points of the implicit function to vertices of a three-dimensional mesh and applies the corresponding deformations to generate a modified three-dimensional mesh. Accordingly, by preserving or applying the values and gradients, the modification transfer system 102 determines vertex locations for the transfer-modified three-dimensional model 508 from the three-dimensional model 504. Thus, the modification transfer system 102 seeks to find $v_1'$ such that:

$$\frac{(\nabla f_c(v_1) + \nabla f_m(v_{1'}))^T}{2}(v_1' - v_1) = f_c(v_1) - f_m(v_1').$$

In certain embodiments, the modification transfer system 102 performs deformations or modifications as a sequence of update steps at (all of) the vertices of a three-dimensional mesh (e.g., the three-dimensional model 504). For instance, during each update step the modification transfer system 102 performs operations based on the assumption that the modified implicit function is locally quadratic. Moreover, in some cases, the modification transfer system 102 softly enforces the two enumerated conditions above (e.g., preserving the scalar implicit function values and scalar implicit function gradients) by utilizing or applying a second order Taylor approximation.

In one or more embodiments, the modification transfer system 102 implements deformations to the mesh in a C++ framework. For instance, the modification transfer system 102 computes the first three-dimensional model in PyTorch (a machine-learning framework) and loads it into the C++ framework by utilizing LibTorch (e.g., a C++ API). Given the shape of the three-dimensional model (e.g., the three-dimensional mesh), the modification transfer system 102 obtains the fitting parameters for the implicit function by utilizing the shape fitting code as described above. The modification transfer system 102 loads the fitting parameters from the shape fitting code into a LibTorch model. Indeed, given a point in space, the modification transfer system 102 utilizes autograd (e.g., an automatic differentiation engine) on a loaded torch graph (e.g., a dynamic computation graph) to compute the implicit function, the input-modified implicit function representing the input-modified three-dimensional model, and their gradients.

In these or other embodiments, the modification transfer system 102 regularizes a deformation or a modification as part of the process of transferring the modification to a three-dimensional mesh. Indeed, because some modifications are sparse (e.g., corresponding to points or vertices that are widespread), transferring the modification might otherwise result in jagged or irregular deformations to a mesh. To prevent this, the modification transfer system 102 utilizes non-linear as-rigid-as-possible (ARAP) energy over each update step of the vertices of the three-dimensional mesh as described by Olga Sorkine & Marc Alexa, *As-Rigid-As-Possible Surface Modeling*, Symposium on Geometry Processing vol. 4 (2007). In some cases, utilizing non-linear ARAP energy over each update step smoothly preserves geometric details as much as possible.

In some embodiments, the modification transfer system 102 utilizes within the C++ framework, as discussed above, a Laplacian computation, function, operator, and/or matrix to regularize each update step. For example, the modification transfer system 102 changes the definition of a vertex from Cartesian coordinates to differential coordinates by utilizing a linear operator with local support. The modification transfer system 102 then applies a modification to the differential coordinates. In some cases, the modification transfer system 102 solves a least-squares problem to convert the differential coordinates (back) to the Cartesian coordinates. By utilizing the least-squares solution, the modification transfer system 102 globally distributes errors from the update steps which preserves surface details. In one or more embodiments, the modification transfer system 102 utilizes a Laplacian computation while modifying the existing ARAP code to increase the speed of the LLT solver (e.g., a process or algorithm for solving a Cholesky decomposition or a Cholesky factorization). In one or more embodiments, the modification transfer system 102 encapsulates or determines the regularization energies using a Laplacian operator as part of a single linear solve of overdetermined systems (e.g., method of least squares, best fit in the least-squares sense). In some instances, the modification transfer system 102 adds the smooth ARAP functionality in the local step of the ARAP where a rotation matrix is computed per element, to best describe the local transformation around this element (best aligning locally the geometry of the input mesh to its current deformed state).

In one or more embodiments, involving the global solve of the ARAP iterations, the modification transfer system 102 incorporates the equations enforcing the two enumerated conditions above (e.g., preserving the scalar implicit function values and scalar implicit function gradients) in conjunction with the Poisson equation from the ARAP. In certain cases, the modification transfer system 102 utilizes a few local-global iterations. In these or other cases, the left-hand side matrix is not pre-factored since it also incorporates the implicit function scalar implicit function gradients which change after an update. In some cases, the modification transfer system 102 introduces local rotation kinks as the part of regularizing the update steps to locally minimize energy. To mitigate the local rotation kinks, the modification transfer system 102 utilizes a Smooth ARAP model to regularize the computed local rotational deformations, such as the Smooth ARAP model described by Zohar Levi & Craig Gotsman, *Smooth Rotation Enhanced As-Rigid-As-Possible Mesh Animation*, IEEE Transactions on Visualization and Computer Graphics, vol. 21, issue 2, pp. 264-277 (September 2014). For instance, once the modification transfer system 102 deforms all of the vertices of the three-dimensional mesh according to the scalar implicit function values and the scalar implicit function gradients, the modification transfer system 102 utilizes Smooth ARAP to locally minimize the energy.

In one or more embodiments, the modification transfer system 102 further smooths the result of a deformation transfer by using a particular objective function. For example, the modification transfer system 102 smooths the surfaces (or edges between vertices) of a modified three-dimensional mesh by utilizing an L2 smoothness objective function or an L1 smoothness objective function. For instance, the modification transfer system 102 utilizes an L1 smoothness objective function to allow for discontinuities in deformations of the vertices of a three-dimensional mesh. By using an L1 smoothness objective function, the modification transfer system 102 is able to determine local transformation spaces per primitive conditioned on edits to primitives of an implicit function. For instance, the modification transfer system 102 permits stretching and/or compression in a specific range, rather than only facilitating pure rotations.

As mentioned, and as further shown in FIG. 5, the modification transfer system 102 modifies a three-dimensional mesh representing the three-dimensional model 504 to generate the transfer-modified three-dimensional model 508 (e.g., a deformed version of the three-dimensional mesh). In some cases, because the modification transfer system 102 utilizes implicit functions, scalar implicit field values, and scalar implicit field gradients, the modification transfer system 102 is capable of transferring local edits to a three-dimensional mesh. For example, if the modification transfer system 102 only modifies a certain feature of a three-dimensional model while preserving the other unmodified features, then the modification transfer system 102 transfers these local modifications to a three-dimensional mesh while leaving other portions of the mesh unchanged. For example, if the user adjusts a handle to lengthen a three-dimensional model of a table, the modification transfer system only modifies the length of the three-dimensional model of the table while maintaining the shape, position, and/or structure of unmodified semantic parameters (e.g., table width, leg height, leg position, etc.).

Figure 6:
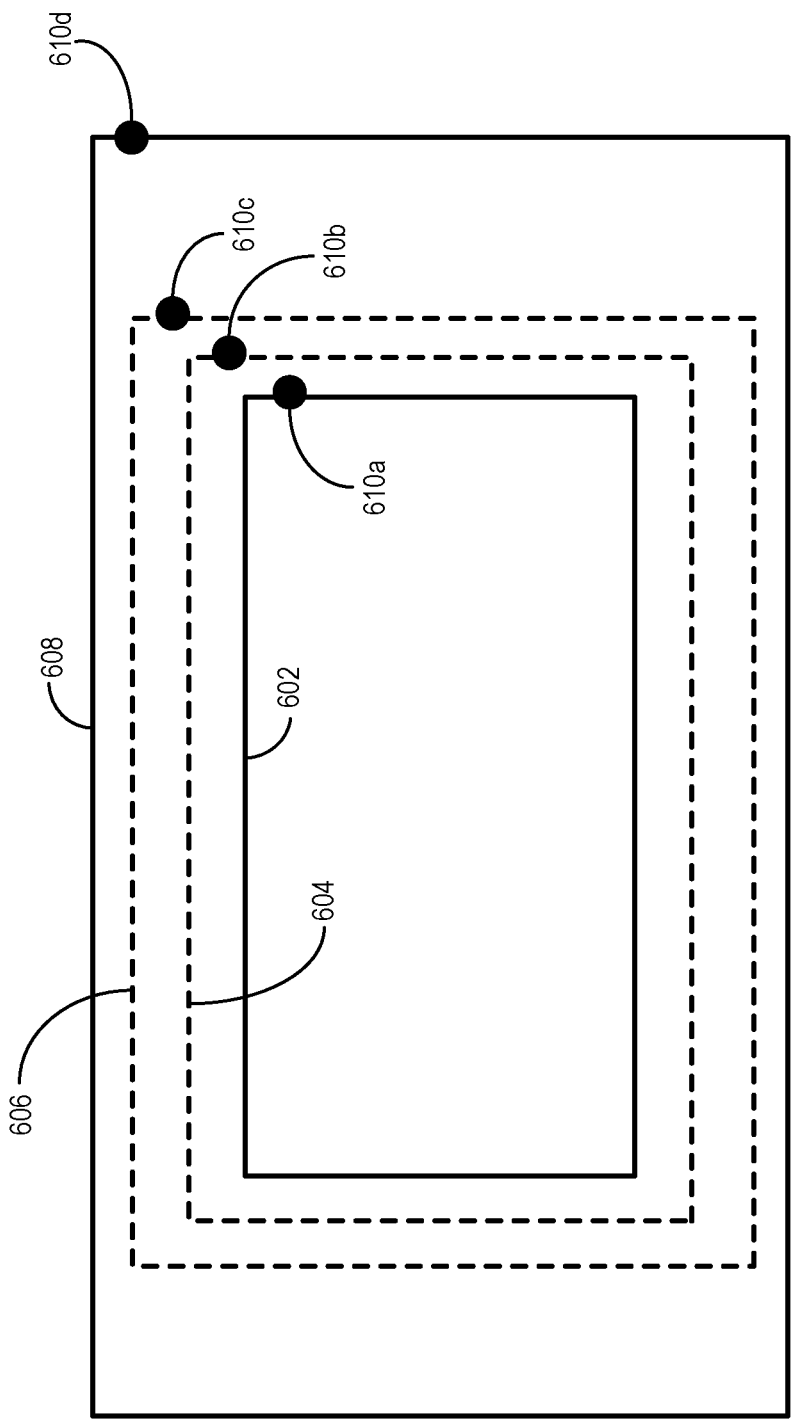
FIG. 6 illustrates an example diagram for subdividing the modification to the three-dimensional model in accordance with one or more embodiments.

As mentioned above, in certain embodiments, the modification transfer system 102 subdivides a modification into multiple sub-edits. By subdividing a single modification into multiple constituent modifications, the modification transfer system 102 more accurately preserves scalar implicit function gradients before and after modification, especially for large modifications (e.g., modifications where a three-dimensional model grows, shrinks, rotates, or otherwise transforms by at least a threshold amount). For example, the modification transfer system 102 subdivides a modification by determining and utilizing a number of intermediate implicit functions to guide vertices of a three-dimensional mesh to proper locations. FIG. 6 illustrates an example diagram for subdividing a modification in accordance with one or more embodiments.

As shown in FIG. 6, the modification transfer system 102 subdivides the modification or deformation from an initial implicit function 602 (representing an unmodified three-dimensional model) to a modified implicit function 608 (representing a modified three-dimensional model). To elaborate, the modification transfer system 102 determines piecewise, incremental modifications as intermediate steps between the initial implicit function 602 and the modified implicit function 608. For instance, the modification transfer system 102 generates intermediate implicit functions as modification steps between an initial function and a final function. By determining and utilizing intermediate implicit functions, the modification transfer system 102 prevents the scalar implicit function gradient between the modified implicit function 608 and the point 610*a* from pulling the point 610*a* in an incorrect direction, which would otherwise resulting in inaccurate stretching or warping of a model.

Indeed, as discussed above, the scalar implicit function gradient points toward the nearest edge of an implicit shape (e.g., isosurface of the implicit function). As shown in FIG. 6, the nearest edge or point from the point 610*a* to the modified implicit shape 608 is the top edge of the modified implicit shape 608. However, the correct scalar implicit function gradient for defining the modification from the initial implicit shape 602 to the modified implicit shape 608 should indicate the point 610*d* (which corresponds to the point 610*a*). Accordingly, to prevent this type of incorrect gradient determination the modification transfer system 102 subdivides the deformation into multiple steps using a first intermediate implicit shape 604 and a second intermediate implicit shape 606.

Indeed, to accurately preserve scalar implicit function gradients, the modification transfer system 102 utilizes a number of intermediate implicit functions that are spaced and sized to obtain the correct gradient directions. In some cases, the modification transfer system 102 determines the number of intermediate implicit functions and/or the spacing for the intermediate implicit functions to ensure correct gradient directions. In particular, the modification transfer system 102 generates and places the first intermediate implicit function 604 so that the nearest edge of the first intermediate implicit function 604 is in the correct direction form the point 610*a* (resulting in the point 610*b*).

As shown in FIG. 6, the modification transfer system 102 utilizes the first intermediate implicit function 604 to guide the gradient to the point 610*b*. As further indicated in FIG. 6, the modification transfer system 102 performs additional sub-edits to preserve the scalar implicit function gradient. For example, FIG. 6 shows the modification transfer system 102 utilizing a second intermediate implicit function 606 to guide the transformation of the point 610*b* to the right. Indeed, as shown in FIG. 6, the modification transfer system 102 deforms the point 610*b* to the location and direction of the point 610*c*.

Based on the sub-edits, the modification transfer system 102 ultimately directs the point 610*a* to the correct location of the point 610*d*. While FIG. 6 illustrates two sub-edits, in some embodiments, the modification transfer system 102 performs more or fewer sub-edits to ensure correct value and gradient determinations for transforming an implicit function. Indeed, in some embodiments, the modification transfer system 102 utilizes any number of sub-edits, intermediate implicit functions, and/or update steps to preserve the field distance signed gradient for vertices of the three-dimensional mesh. As mentioned above, the modification transfer system 102 can receive user input indicating and/or defining the number of sub-edits to employ to maintain the scalar implicit function gradients.

In some embodiments, the modification transfer system 102 subdivides a modification if the modification exceeds a modification threshold value (e.g., a threshold distance between source points and modified points on an implicit function). For instance, the modification transfer system 102 determines the modification threshold based on the magnitude of the modification. For example, if the user interaction with a handle expands a semantic parameter of the three-dimensional model by a threshold amount (e.g., more than 50%), the modification transfer system 102 subdivides the modification into smaller sub-edits. In one or more embodiments, the modification transfer system 102 automatically defines the modification threshold based on a shape and/or complexity of an implicit function. In other embodiments, the modification transfer system 102 receives user input defining the modification threshold.

Figure 7:
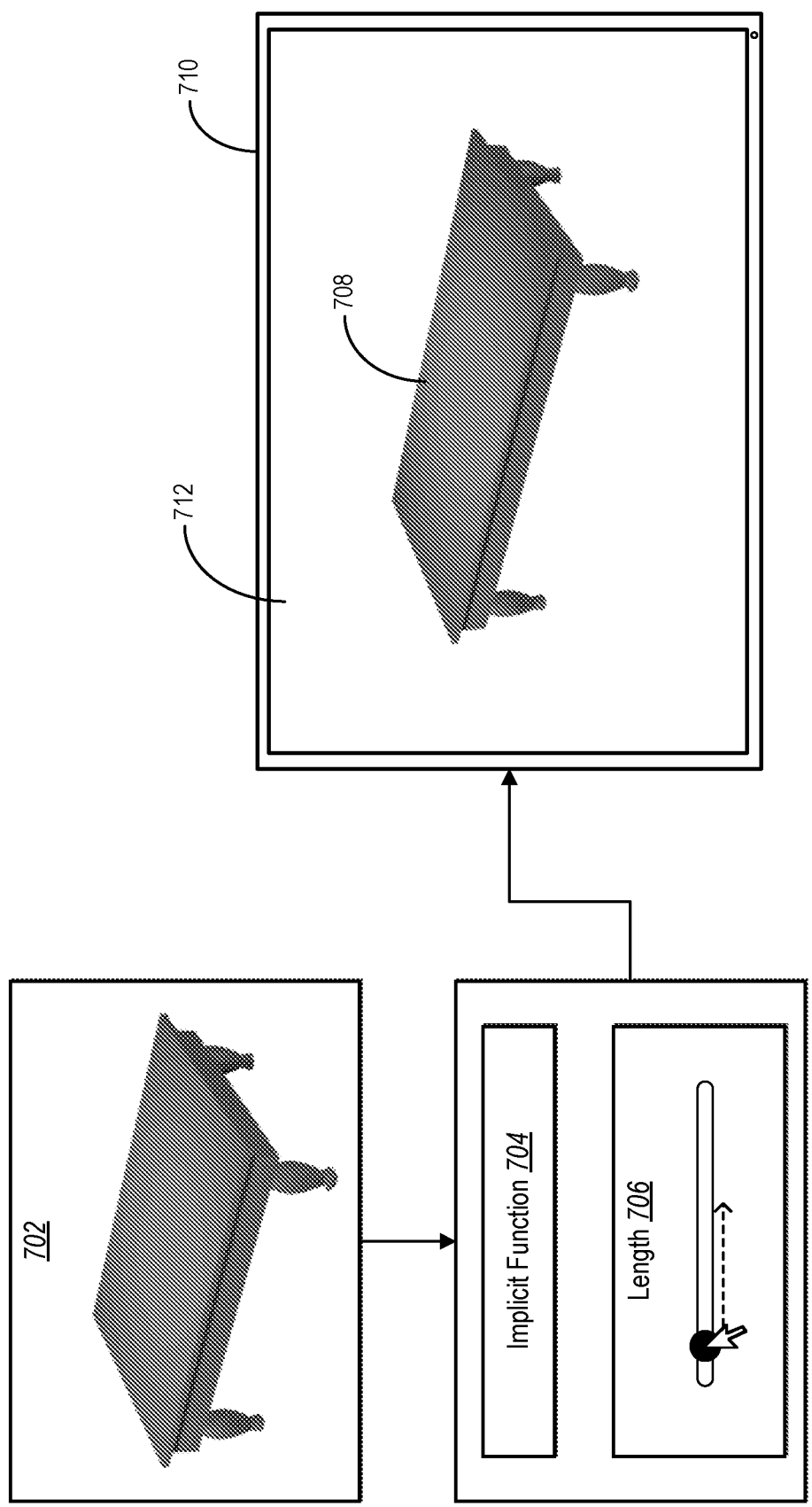
FIG. 7 illustrates an example diagram of the modification transfer system providing for display a modified three-dimensional model in accordance with one or more embodiments.

As mentioned, in certain embodiments, the modification transfer system 102 transfers semantic parameter modifications made to an implicit function to a three-dimensional model. In particular, the modification transfer system 102 provides handles within a model manipulation interface for modifying a low-parameter implicit function and further applies the modifications to a high-parameter three-dimensional model, such as a three-dimensional mesh. FIG. 7 illustrates an example diagram of the modification transfer system 102 modifying a high-parameter three-dimensional model based on transferring deformations made to a low-parameter implicit function in accordance with one or more embodiments.

As illustrated in FIG. 7, in one or more embodiments, the modification transfer system 102 accesses a three-dimensional model of a table 702. More specifically, the modification transfer system 102 receives a three-dimensional mesh of the table 702 from the client device 108. In some embodiments, the modification transfer system 102 receives the three-dimensional mesh based on a user providing (e.g., uploading) the three-dimensional mesh to the modification transfer system 102. In some cases, the modification transfer system 102 further fits an implicit function 704 to the mesh of the table 702 by aligning the implicit function 704 with the mesh of the table 702.

As further shown in FIG. 7, the modification transfer system 102 receives user input to increase the length 706 of the table 702. In particular, the modification transfer system 102 receives or detects a user interaction adjusting a handle corresponding to the length 706. Based on the handle adjustment, the modification transfer system 102 modifies the implicit function 704 to reflect the modified length. Based on the modification to the implicit function 704, the modification transfer system 102 further transfers the modifications from the implicit function 704 to the (mesh representing the) table 702. Accordingly, the modification transfer system 102 provides for display a modified three-dimensional model depicting a modified table 708 reflecting the modified length. Indeed, the modification transfer system 102 provides a graphical user interface 712 on a client device 710 (e.g., the client device 110), where the graphical user interface 712 includes a visual representation of the modified table 708.

Figure 8:
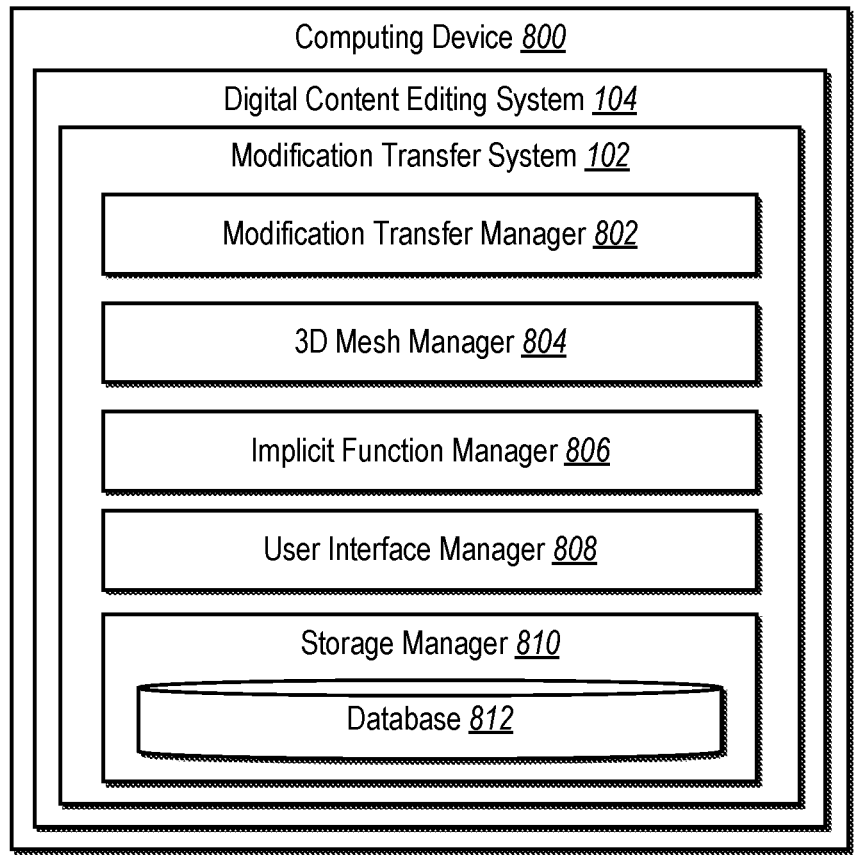
FIG. 8 illustrates an example schematic diagram of a modification transfer system in accordance with one or more embodiments.

Looking now to FIG. 8, additional detail will be provided regarding components and capabilities of the modification transfer system 102. Specifically, FIG. 8 illustrates an example schematic diagram of the modification transfer system 102 on an example computing device 800 (e.g., the client device 110, and/or the server(s) 106). As shown in FIG. 8, the modification transfer system 102 includes a modification transfer manager 802, a three-dimensional mesh manager 804, an implicit function manager 806, a user interface manager 808, and a storage manager 810.

As just mentioned, the modification transfer system 102 includes a modification transfer manager 802. In particular, the modification transfer manager 802 manages, maintains, transfers, applies, translates, generates, determines, observes, receives, detects, or ingests modifications to three-dimensional models. For example, the modification transfer manager 802 detects modifications to a three-dimensional model via parameter handles of a user interface. In addition, the modification transfer manager 802 applies or transfers the modifications from an implicit function to a three-dimensional model.

In addition, the modification transfer system 102 includes a three-dimensional mesh manager 804. In particular, the three-dimensional mesh manager 804 manages, maintains, modifies, manipulates, adjusts, generates, determines, accesses, or identifies three-dimensional meshes. For example, the three-dimensional mesh manager 804 accesses three-dimensional meshes from a third-party server. The three-dimensional mesh manager 804 can further communicate with the modification transfer manager 802 to apply or transfer modifications to a three-dimensional mesh to deform the three-dimensional mesh.

Further, the modification transfer system 102 includes an implicit function manager 806. In particular, the implicit function manager 806 manages, determines, fits, or generates, modifies, manipulates, deforms, or adjusts implicit functions representing three-dimensional models. For example, the implicit function manager 806 fits an implicit function to a three-dimensional mesh. In some cases, the implicit function manager 806 modifies the implicit function to reflect the modifications received from user input.

Additionally, the modification transfer system 102 includes a user interface manager 808. In particular, the user interface manager 808 manages, determines, generates, and/or provides for display a model manipulation interface that includes handles for adjusting semantic parameters of a three-dimensional model. For example, the user interface manager 808 determines the degree to which one or more handles are adjusted. The user interface manager 808 further determines which handles to display based on the semantic parameters of the three-dimensional model and/or the implicit function. The user interface manager 808 further generates and provides a modified three-dimensional mesh for display based on deformations transferred from an implicit function.

The modification transfer system 102 further includes a storage manager 810. The storage manager 810 operates in conjunction with, or includes, one or more memory devices such as the database 812 that stores various data such as three-dimensional models, implicit functions, and/or modifications made to the three-dimensional models.

In one or more embodiments, each of the components of the modification transfer system 102 are in communication with one another using any suitable communication technologies. Additionally, the components of the modification transfer system 102 is in communication with one or more other devices including one or more client devices described above. It will be recognized that although the components of the modification transfer system 102 are shown to be separate in FIG. 8, any of the subcomponents may be combined into fewer components, such as into a single component, or divided into more components as may serve a particular implementation. Furthermore, although the components of FIG. 8 are described in connection with the modification transfer system 102, at least some of the components for performing operations in conjunction with the modification transfer system 102 described herein may be implemented on other devices within the environment.

The components of the modification transfer system 102 include software, hardware, or both. For example, the components of the modification transfer system 102 include one or more instructions stored on a computer-readable storage medium and executable by processors of one or more computing devices (e.g., the computing device 800). When executed by the one or more processors, the computer-executable instructions of the modification transfer system 102 cause the computing device 800 to perform the methods described herein. Alternatively, the components of the modification transfer system 102 comprise hardware, such as a special purpose processing device to perform a certain function or group of functions. Additionally, or alternatively, the components of the modification transfer system 102 include a combination of computer-executable instructions and hardware.

Furthermore, the components of the modification transfer system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the modification transfer system 102 may be implemented as part of a stand-alone application on a personal computing device or a mobile device. Alternatively, or additionally, the components of the modification transfer system 102 may be implemented in any application that allows creation and delivery of content to users, including, but not limited to, applications in ADOBE® EXPERIENCE MANAGER, CREATIVE CLOUD®, such as PHOTOSHOP®, LIGHTROOM®, and INDESIGN®, and ADOBE® SUBSTANCE 3D™, such as SUBSTANCE 3D MODELER, SUBSTANCE 3D DESIGNER, SUBSTANCE 3D SAMPLER, SUBSTANCE 3D PAINTER, SUB- STANCE 3D STAGER, and SUBSTANCE 3D ASSETS. "ADOBE," "ADOBE EXPERIENCE MANAGER," "CREATIVE CLOUD," "ADOBE SUBSTANCE 3D," "PHOTOSHOP," "LIGHTROOM," and "INDESIGN" are either registered trademarks or trademarks of Adobe Inc. in the United States and/or other countries.

FIGS. 1-8 the corresponding text, and the examples provide a number of different systems, methods, and non-transitory computer readable media for transferring modifications from one three-dimensional model to another. In addition to the foregoing, embodiments can also be described in terms of flowcharts comprising acts for accomplishing a particular result. For example, FIG. 9 illustrates a flowchart of an example sequences or series of acts in accordance with one or more embodiments.

Figure 9:
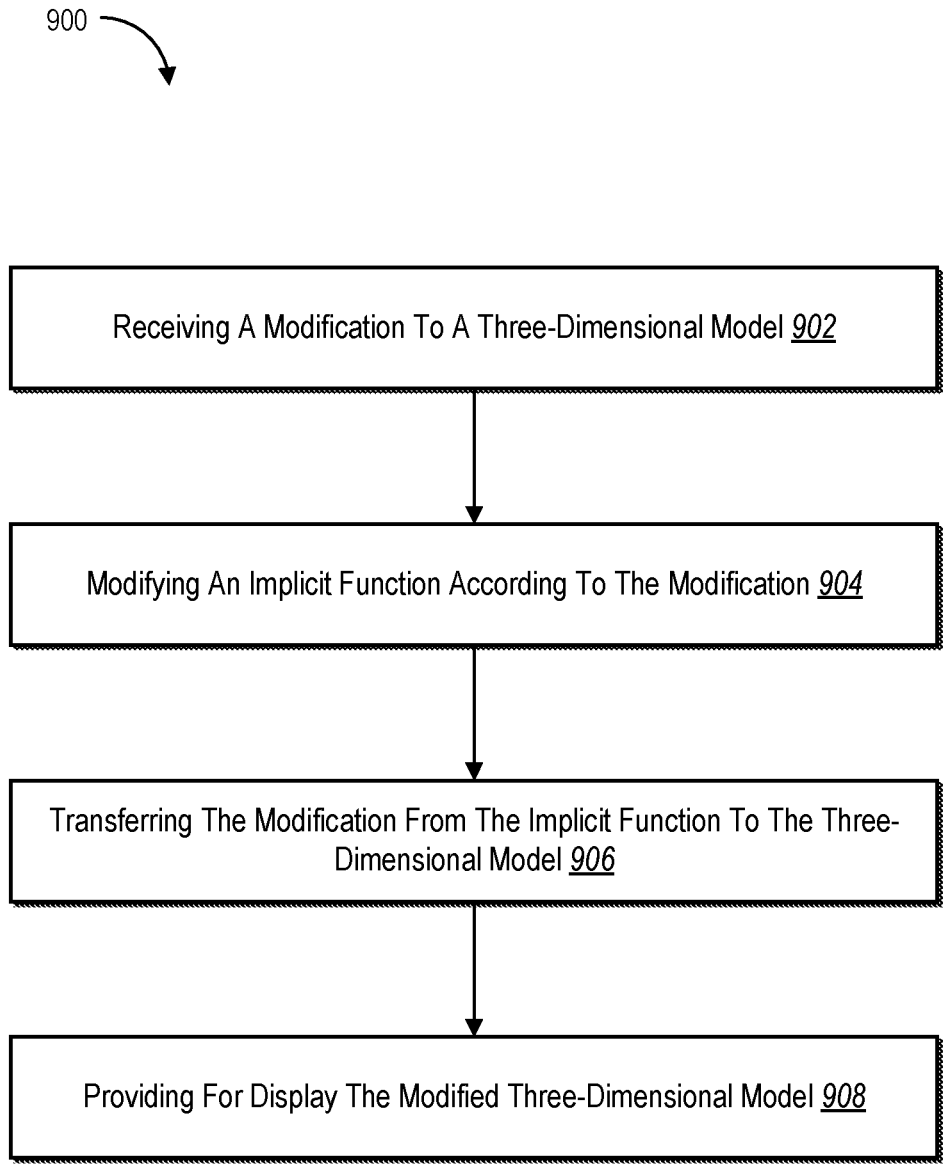
FIG. 9 illustrates a flowchart of a series of acts for transferring a modification from an implicit function to a three-dimensional model in accordance with one or more embodiments.

While FIG. 9 illustrates acts according to particular embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for transferring edits from an implicit function to a three-dimensional model. In particular, the series of acts 900 includes an act 902 of receiving an indication of a user interaction defining a modification to a three-dimensional model.

As shown, the series of acts 900 includes an act 904 of modifying the first three-dimensional model according to the modification. In particular, an act 906 includes an act of in response to the user interaction, modifying an implicit function corresponding to the three-dimensional model according to the modification.

In addition, the series of acts 900 includes an act 906 of transferring the modification from the implicit function to the three-dimensional model. In particular, the act 906 involves based on modifying the implicit function, generating a modified three-dimensional model by transferring the modification from the implicit function to the three-dimensional model. In additional embodiments, the act 906 involves preserving values associated with the implicit function and preserving gradients associated with the implicit function.

Further, the series of acts 900 includes an act 908 of providing for display the modified three-dimensional model. In particular, the act 908 involves providing the modified three-dimensional model for display on a client device.

In some embodiments, the series of acts 900 includes an act where generating the modified three-dimensional model comprises preserving values associated with the implicit function as part of transferring the modification. In one or more embodiments, the series of acts 900 includes an act where generating the modified three-dimensional model comprises preserving gradients associated with the implicit function as part of transferring the modification.

In certain embodiments, the series of acts 900 involves an act where generating the modified three-dimensional model comprises transferring the modification from the implicit function to a three-dimensional mesh representing the three-dimensional model. In some cases, the series of acts 900 includes an act where the implicit function is modifiable in a first parameter space and the three-dimensional model comprises a three-dimensional mesh modifiable by moving its set of vertices while preserving their connectivity (polygons of the mesh, describing its surface).

In one or more cases, the series of acts 900 includes an act where receiving the indication of the user interaction defining the modification comprises receiving, from a client device, an indication of an adjustment to a handle for adjusting a semantic parameter associated with the implicit function within a model manipulation interface. In some embodiments, the series of acts 900 includes an act where preserving the values associated with the implicit function comprises: determining an implicit function value at a point in space before the modification and after the modification and determining a transformation for the three-dimensional model that will preserve the distance at the point to a vertex of the three-dimensional model.

.In certain embodiments, the series of acts 900 includes an act where preserving the gradients associated with the implicit function comprises determining a gradient at a point before the modification and after the modification and determining a transformation for the three-dimensional model that will preserve the gradient at the point to a vertex of the three-dimensional model.

In one or more embodiments, the series of acts 900 includes an act where generating the modified three-dimensional model comprises transferring the modification to a three-dimensional mesh representing the three-dimensional model. In some cases, the series of acts 900 includes an act where transferring the modification to the three-dimensional model comprises applying the modification to a subset of vertices of a three-dimensional mesh. In certain embodiments, the series of acts 900 includes an act where transferring the modification from the implicit function to the three-dimensional model comprises subdividing the modification into a sequence of deformation steps that preserve implicit function values and implicit function gradients at mesh vertices of the three-dimensional model; and applying the sequence of deformation steps to vertices of the three-dimensional model.

In one or more embodiments, the series of acts 900 includes an act where generating the modified three-dimensional model comprises transferring the modification from the implicit function to the three-dimensional model by using only the parameter space associated with the implicit function. In one or more embodiments, the series of acts 900 includes an act where the one or more processing devices are further to configured to perform operations comprising smoothing deformations of the modified three-dimensional model that result from transferring the modification.

In one or more embodiments, the series of acts 900 includes an act where generating the modified three-dimensional model comprises preserving implicit function values at mesh vertices as part of transferring the modification. In certain embodiments, the series of acts 900 includes an act where generating the modified three-dimensional model comprises preserving implicit function gradients at mesh vertices as part of transferring the modification.

In one or more embodiments, the series of acts 900 includes an act where the implicit function is modifiable in a first parameter space and the three-dimensional model comprises a three-dimensional mesh modifiable by moving its set of vertices while preserving their connectivity.

In some embodiments, the series of acts 900 includes an act where receiving the indication of the user interaction defining the modification comprises receiving, from a client device, an indication of an adjustment to a handle or adjusting a semantic parameter associated with the implicit function within a model manipulation interface.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
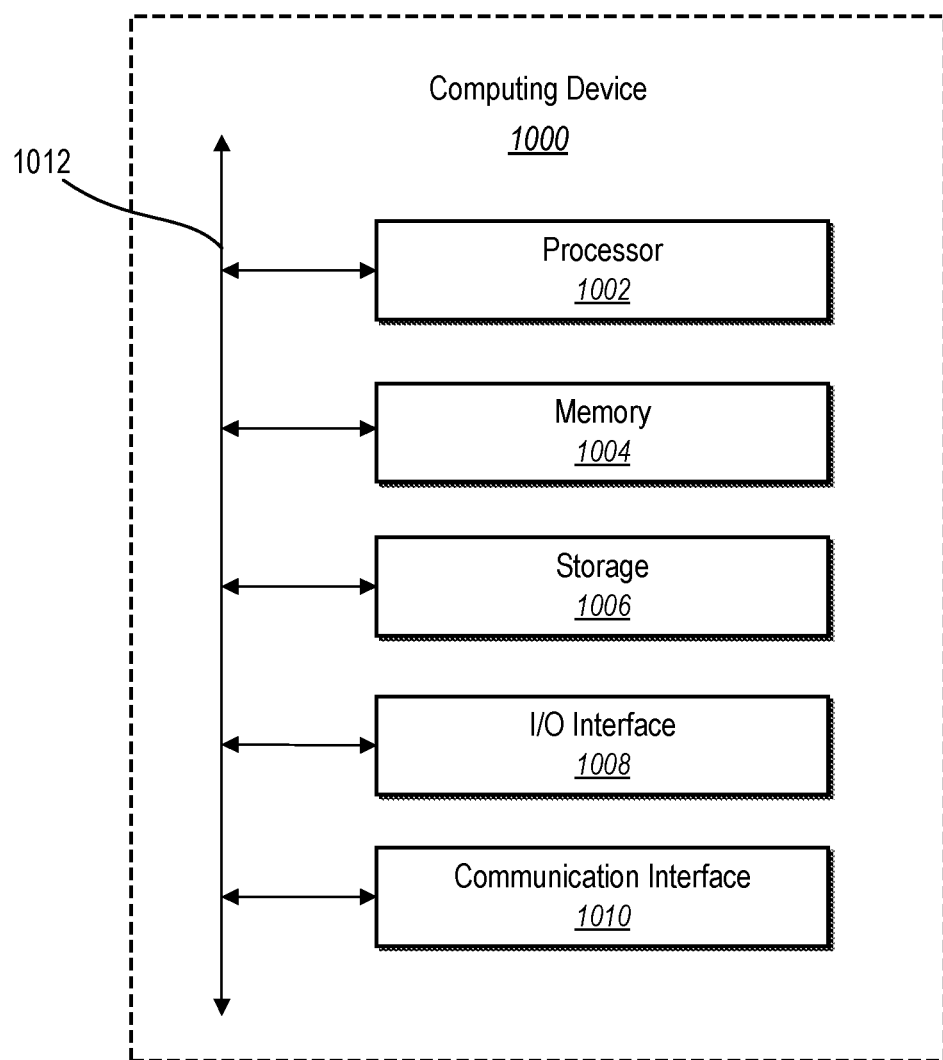
FIG. 10 illustrates a block diagram of an exemplary computing device in accordance with one or more embodiments.

FIG. 10 illustrates, in block diagram form, an example computing device 1000 (e.g., the computing device 800, the client device 110, and/or the server(s) 106) that may be configured to perform one or more of the processes described above. One will appreciate that the modification transfer system 102 can comprise implementations of the computing device 1000. As shown by FIG. 10, the computing device can comprise a processor(s) 1002, memory 1004, a storage device 1006, an I/O interface 1008, and a communication interface 1010. Furthermore, the computing device 1000 can include an input device such as a touchscreen, mouse, keyboard, etc. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive (HDD), flash memory, a Universal Serial Bus (USB) drive or a combination of these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a writing device or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

The invention claimed is:

1. A method comprising:
fitting an implicit function to a three-dimensional mesh associated with a three-dimensional model;
receiving an indication of a user interaction defining a modification to thea three-dimensional model;
in response to the user interaction, generating a modified implicit function by modifying the implicit function corresponding to the three-dimensional model according to the modification;
determining implicit function gradients and implicit function values based on comparing the implicit function and the modified implicit function;
based on preserving the implicit function gradients and implicit function values, generating a modified three-dimensional model by transferring the modification from the implicit function to the three-dimensional model; and
providing the modified three-dimensional model for display on a client device.

2. The method of claim 1, wherein implicit function values reflect distances of initial points of the implicit function and corresponding nearest points of the modified implicit function.

3. The method of claim 1, wherein implicit function gradients reflect directions of initial points of the implicit function and corresponding nearest points on the modified implicit function.

4. The method of claim 1, wherein generating the modified three-dimensional model comprises transferring the modification from the implicit function to the three-dimensional mesh associated with the three-dimensional model.

5. The method of claim 1, wherein:
the implicit function is modifiable in a first parameter space; and
the three-dimensional mesh associated with the three-dimensional model is modifiable by moving its set of vertices while preserving their connectivity.

6. The method of claim 1, wherein receiving the indication of the user interaction defining the modification comprises receiving, from a client device, an indication of an adjustment to a handle for adjusting a semantic parameter associated with the implicit function within a model manipulation interface.

7. A system comprising:
a memory component; and
one or more processing devices coupled to the memory component, the one or more processing devices to perform operations comprising:
fitting an implicit function to a three-dimensional mesh associated with a three-dimensional model;
receiving an indication of a user interaction defining a modification to thea three-dimensional model;
in response to the user interaction, generating a modified implicit function by modifying the implicit function corresponding to the three-dimensional model according to the modification;
determining implicit function gradients and implicit function values based on comparing the implicit function and the modified implicit function;
generating a modified three-dimensional model by transferring the modification from the implicit function to the three-dimensional model by preserving the implicit function gradients and implicit function values; and
providing the modified three-dimensional model for display on a client device.

8. The system of claim 7, wherein preserving the implicit function values associated with the implicit function comprises:
determining an implicit function value at a point in space before the modification and after the modification; and
determining a transformation for the three-dimensional model that will preserve a distance at the point to a vertex of the three-dimensional model.

9. The system of claim 7, wherein preserving the implicit function gradients associated with the implicit function comprises:
determining a gradient at a point before the modification and after the modification; and
determining a transformation for the three-dimensional model that will preserve the gradient at the point to a vertex of the three-dimensional model.

10. The system of claim 7, wherein generating the modified three-dimensional model comprises transferring the modification to the three-dimensional mesh associated with the three-dimensional model.

11. The system of claim 7, wherein transferring the modification to the three-dimensional model comprises applying the modification to a subset of vertices of the three-dimensional mesh associated with the three-dimensional model.

12. The system of claim 7, wherein transferring the modification from the implicit function to the three-dimensional model comprises:
subdividing the modification into a sequence of deformation steps that preserve the implicit function values and the implicit function gradients at mesh vertices of the three-dimensional model; and
applying the sequence of deformation steps to vertices of the three-dimensional model.

13. The system of claim 7, wherein generating the modified three-dimensional model comprises transferring the modification from the implicit function to the three-dimensional model by using only a parameter space associated with the implicit function.

14. The system of claim 7, wherein the one or more processing devices are further to configured to perform operations comprising smoothing deformations of the modified three-dimensional model that result from transferring the modification.

15. A non-transitory computer readable medium storing executable instructions which, when executed by a processing device, cause the processing device to perform operations comprising:
fitting an implicit function to a three-dimensional mesh associated with a three-dimensional model;
receiving an indication of a user interaction defining a modification to the three-dimensional model;
in response to the user interaction, generating a modified implicit function by modifying the implicit function corresponding to the three-dimensional model according to the modification;
determining implicit function gradients and implicit function values based on comparing the implicit function and the modified implicit function;
based on preserving the implicit function gradients and implicit function values, generating a modified three-dimensional model by transferring the modification from the implicit function to the three-dimensional model; and
providing the modified three-dimensional model for display on a client device.

16. The non-transitory computer readable medium of claim 15, wherein generating the modified three-dimensional model comprises preserving implicit function values at mesh vertices as part of transferring the modification.

17. The non-transitory computer readable medium of claim 15, wherein generating the modified three-dimensional model comprises preserving the implicit function gradients at mesh vertices as part of transferring the modification.

18. The non-transitory computer readable medium of claim 15, wherein generating the modified three-dimensional model comprises transferring the modification from the implicit function to the three-dimensional mesh associated with the three-dimensional model.

19. The non-transitory computer readable medium of claim 15, wherein:
the implicit function is modifiable in a first parameter space; and
the three-dimensional mesh associated with the three-dimensional model is modifiable by moving its set of vertices while preserving their connectivity.

20. The non-transitory computer readable medium of claim 15, wherein receiving the indication of the user interaction defining the modification comprises receiving, from a client device, an indication of an adjustment to a handle or adjusting a semantic parameter associated with the implicit function within a model manipulation interface.

* * * * *